US011113051B2

(12) United States Patent
Bajic et al.

(10) Patent No.: US 11,113,051 B2
(45) Date of Patent: *Sep. 7, 2021

(54) PROCESSING CORE WITH METADATA ACTUATED CONDITIONAL GRAPH EXECUTION

(71) Applicant: Tenstorrent Inc., Toronto (CA)

(72) Inventors: Ljubisa Bajic, Toronto (CA); Milos Trajkovic, Toronto (CA); Ivan Hamer, Toronto (CA); Lejla Bajic, Ontario (CA); Aleksandar Cejkov, Ontario (CA)

(73) Assignee: Tenstorrent Inc., Toronto (CA)

( * ) Notice: Subject to any disclaimer, the term of this patent is extended or adjusted under 35 U.S.C. 154(b) by 361 days.

This patent is subject to a terminal disclaimer.

(21) Appl. No.: 16/153,991

(22) Filed: Oct. 8, 2018

(65) Prior Publication Data

US 2019/0050224 A1     Feb. 14, 2019

Related U.S. Application Data

(63) Continuation-in-part of application No. 15/963,315, filed on Apr. 26, 2018, now Pat. No. 10,817,293.

(Continued)

(51) Int. Cl.
*G06F 9/30* (2018.01)
*G06N 3/04* (2006.01)
(Continued)

(52) U.S. Cl.
CPC ...... *G06F 9/30003* (2013.01); *G06F 16/9024* (2019.01); *G06N 3/04* (2013.01); *G06N 3/08* (2013.01)

(58) Field of Classification Search
CPC .................................................. G06F 9/30072
See application file for complete search history.

(56) References Cited

U.S. PATENT DOCUMENTS 4,660,166 A * 4/1987 Hopfield ............... G06N 3/063
                                                          708/801
4,751,572 A * 6/1988 Baumbaugh ........... H04N 1/41
                                                          358/1.9

(Continued)

FOREIGN PATENT DOCUMENTS

EP          1328096 A2      7/2003
EP          1193502 A3      6/2005

OTHER PUBLICATIONS

International Preliminary Report on Patentability dated Nov. 7, 2019 from International Application No. PCT/IB2018/052953 filed Apr. 27, 2018, 7 pages.

(Continued)

*Primary Examiner* — James D. Rutten
(74) *Attorney, Agent, or Firm* — Daylight Law, P.C.

(57) ABSTRACT

A processing core and associated methods for the efficient execution of a directed graph are disclosed. A disclosed processing core comprises a memory and a first data tile stored in the memory. The first data tile includes a first set of data elements and metadata stored in association with the first set of data elements. The processing core also comprises a second data tile stored in the memory. The second data tile includes a second set of data elements. The processing core also comprises an arithmetic logic unit configured to conduct an arithmetic logic operation using data from the first set of data elements and the second set of data elements. The processing core also comprises a control unit configured to evaluate the metadata and control the arithmetic logic unit to conditionally execute the arithmetic logic operation based on the evaluation of the metadata.

20 Claims, 9 Drawing Sheets

Related U.S. Application Data

(60) Provisional application No. 62/491,767, filed on Apr. 28, 2017.

(51) Int. Cl.
*G06N 3/08* (2006.01)
*G06F 16/901* (2019.01)

(56) References Cited

U.S. PATENT DOCUMENTS

| | | | |
|---|---|---|---|
| 5,087,826 A | 2/1992 | Holler | |
| 5,465,368 A | 11/1995 | Davidson | |
| 6,334,121 B1* | 12/2001 | Primeaux | G06F 21/552 706/52 |
| 6,745,384 B1 | 6/2004 | Biggerstaff | |
| 8,736,624 B1* | 5/2014 | Mahan | G06T 15/005 345/522 |
| 8,738,860 B1 | 5/2014 | Griffin | |
| 2006/0294150 A1* | 12/2006 | Stanfill | G06F 8/51 |
| 2012/0303933 A1 | 11/2012 | Manet | |
| 2014/0366033 A1* | 12/2014 | Nystad | G06F 9/50 718/104 |
| 2015/0192950 A1 | 7/2015 | Tubbs | |
| 2016/0162402 A1* | 6/2016 | Woolley, Jr. | G06K 9/00288 711/202 |
| 2016/0210723 A1 | 7/2016 | Yang | |
| 2016/0358068 A1 | 12/2016 | Brothers et al. | |
| 2017/0083431 A1 | 3/2017 | Burger | |
| 2018/0121786 A1* | 5/2018 | Narayanaswami | G06N 3/0454 |
| 2018/0218518 A1* | 8/2018 | Yan | G06N 3/063 |

OTHER PUBLICATIONS

A. Almahairi, et al., Dynamic Capacity Networks, arXiv:1511.07838v7, May 2016.
A. Davis, et al., Low-Rank Approximations for Conditional Feedforward Computation in Deep Neural Networks, arXiv:1312.4461v4, Jan. 2014.
D. Coopersmith and S. Winograd, Matrix Multiplication via Arithmetic Progressions, J. Symbolic Computation 9, 251-280 (1990).
E. Bengio, et al., Conditional Computation in Neural Networks for Faster Models, ICLR 2016.
J. Zhu, et al., LRADNN: High-throughput and energy-efficient Deep Neural Network Accelerator using Low Rank Approximation, Design Automation Conference, 2016 21st Asia and South Pacific, Jan. 25-28, 2016.
K. Cho, et al., Exponentially Increasing the Capacity-to-Computation Ratio for Conditional Computation in Deep Learning, arXiv:1406.7362v1, Jun. 2014.
L. Ba et al., Adaptive Dropout for Training Deep Neural Networks, Proceedings of the 26th International Conference on Neural Information Processing Systems, vol. 2, pp. 3084-3092, Dec. 5-10, 2013.
L. Denoyer, et al., Deep Sequential Neural Network, arXiv:1410.0510, Oct. 2014.
M. Denil, et al., Predicting Parameters in Deep Learning, arXiv:1306.0543v2, Oct. 2014.
M. Stollenga, et al., Deep Networks with Internal Selective Attention through Feedback Connections, NIPS, 2014, Available at: http://people.idsia.ch/~stollenga/; Accessed on: Mar. 1, 2017.
N. Shazeer, et al., Outrageously Large Neural Networks: The Sparsely-Gated Mixture-of-Experts Layer, arXiv:1701.06538v1, Jan. 2017.
PCT International Search Report_PCT/162018/052953_dated Jul. 13, 2018.
Y. Bengio, et al., Deep Learning of Representations: Looking Forward, arXiv:1305.0445v2, Jun. 2013.
Y. Bengio, et al., Estimating or Propagating Gradients Through Stochastic Neurons for Conditional Computation, arXiv:1308.3432v1, Aug. 2013.
Y. Bengio, et al., Representation Learning: A Review and New Perspectives, arXiv:1206.5538v3, Apr. 2014.
Notice of Allowance dated Sep. 4, 2020 from U.S. Appl. No. 15/963,315, 17 pages.
Nonfinal Office Action dated Feb. 24, 2020 from U.S. Appl. No. 15/963,315, 45 pages.
Extended European Search Report dated Mar. 12, 2021 from European Application No. 18791269.6, 13 pages.
Rahimi Abbas et al., "Circa-GPUs: Increasing Instruction Reuse Through Inexact Computing in GP-GPUs", IEEE Design & Test, IEEE, vol. 33, No. 6, Dec. 11, 2016, pp. 85-92.
Paul E. Utgoff, Perceptron trees: A case study in hybrid concept representations,. In Proceedings of the 7th National Conference on Artificial Intelligence St. Paul, MN, Aug. 21-26, pp. 601-606, 1988.

* cited by examiner

PROCESSING CORE WITH METADATA ACTUATED CONDITIONAL GRAPH EXECUTION

CROSS-REFERENCE TO RELATED APPLICATIONS

This application is a continuation-in-part of U.S. patent application Ser. No. 15/963,315, filed Apr. 26, 2018, which claims the benefit of U.S. Provisional Patent Application No. 62/491,767, filed Apr. 28, 2017, both of which are incorporated by reference herein in their entirety for all purposes.

BACKGROUND

The recent surge in the performance of machine intelligence systems is not due to the development of revolutionary new algorithms. Indeed, the core algorithms used in machine intelligence applications today stem from a body of work that is now over half a century old. Instead, it has been improvements in the hardware and software that implement machine intelligence algorithms in an efficient manner that has fueled the recent surge. Algorithms that were once too computationally intensive to implement in a useful manner with even the most sophisticated of computers can now be executed with specialized hardware on an individual user's smart phone. The improvements in hardware and software take various forms. For example, graphical processing units traditionally used to process the vectors used to render polygons for computer graphics have been repurposed in an efficient manner to manipulate the data elements used in machine intelligence processes. As another example, certain classes of hardware have been designed from the ground-up to implement machine intelligence algorithms by using specialized processing elements such as systolic arrays. Further advances have centered around using collections of transistors and memory elements to mimic, directly in hardware, the behavior of neurons in a traditional artificial neural network (ANN). There is no question that the field of machine intelligence has benefited greatly from these improvements. However, despite the intense interest directed to these approaches, machine intelligence systems still represent one of the most computationally and energy intensive computing applications of the modern age, and present a field that is ripe for further advances.

The reason machine intelligence applications are so resource hungry is that the data structures being operated on are generally very large, and the number of discrete primitive computations that must be executed on each of the data structures are likewise immense. A traditional ANN takes in an input vector, conducts calculations using the input vector and a set of weight vectors, and produces an output vector. Each weight vector in the set of weight vectors is often referred to as a layer of the network, and the output of each layer serves as the input to the next layer. In a traditional network, the layers are fully connected, which requires every element of the input vector to be involved in a calculation with every element of the weight vector. Therefore, the number of calculations involved increases with a power law relationship to the size of each layer. Furthermore, this aspect of machine intelligence algorithms makes them difficult to parallelize because the calculations for each layer depend on the output of the prior layer.

The problems mentioned in the prior paragraph are further exacerbated by modern ANNs. Modern ANN approaches are often referred to in the industry and literature as "deep learning" approaches. This is often a reference to the substantial number of layers involved, or the complexity of the relationships between the outputs of one layer and the inputs of the other layers. For example, in a modern deep learning ANN, the outputs of a downstream layer could be fed back to a prior layer which thereby adds a recursive element to the overall computation. Both the increase in layers, and the additional complexity associated with recursive relationships between the layers, increase the computational resources needed to implement a modern ANN.

FIG. 1 illustrates a directed graph 100 for the computation of a modern machine intelligence system. The input to directed graph 100 is an input tensor X. The output of directed graph 100 is an output tensor Y. The input could be an encoding for a picture, such as an image of a cat 101. In this example, execution of directed graph 100 involves the graph providing an encoding of a textual guess as to what the content of the encoded image contained. The graph output can be referred to as an inference generated by the directed graph because the machine intelligence system is effectively inferring what the picture shows from the encoding of the picture. As such, if directed graph 100 represented a properly trained machine intelligence system, execution of graph 100 with input tensor X would produce an output tensor Y which encoded the word "CAT" as illustrated.

The edges of directed graph 100 represent calculations that must be conducted to execute the graph. In this example, the graph is broken into two sections—a convolutional section 102 and a fully connected section 103. The convolutional portion can be referred to as a convolutional neural network (CNN). The vertices in the directed graph of CNN 102 form a set of layers which includes layers 106, 107, and 108. The layers each include sets of tensors such as tensors 109, 110, and 111. The vertices in the directed graph of fully connected section 103 also form a set of layers which includes layers 112 and 113. Each edge in directed graph 100 represents a calculation involving the origin vertex of the edge. In CNN 102, the calculations are convolutions between the origin vertex and a filter. Each edge in CNN 102 is associated with a different filter $F_{11}$, $F_{n1}$, $F_{12}$, $F_{n2}$ etc. As illustrated, filter $F_{12}$ and tensor 109 subjected to a full convolution to generate one element of tensor 111. Filter $F_{12}$ is "slid around" tensor 109 until a convolution operation has been conducted between the filter and the origin vertex. In other approaches, filter $F_{12}$ and a portion of tensor 109 are multiplied to generate one element of tensor 111 and the full convolution is used to generate multiple elements of tensor 111. In fully connected section 103, the calculations are multiplications between a set of weights and the values from the prior layer. In fully connected section 103, each edge is associated with a unique weight value that will be used in the calculation. For example, edge 114 represents a multiplication between weight $w_n$ and input value 115. The value of element 116 is the sum of a set of identical operations involving all the elements of layer 112 and a set of weight values that uniquely correspond to the origin vertex of each edge that leads to element 116.

Execution of directed graph 100 involves many calculations. In the illustration, dots are used in the vertical directions to indicate the large degree of repetition involved in the directed graph. Furthermore, directed graph 100 represents a relatively simply ANN, as modern ANNs can include far more layers with far more complex interrelationships between the layers. Although not illustrated by directed graph 100, the outputs of one layer can loop back to be the inputs of a prior layer to form what is often referred to as a recursive neural network (RNN). The high degree of flexibility afforded to a machine intelligence system by having numerous elements, along with an increase in the number of layers and complexity of their interrelationships, makes it unlikely that machine intelligence systems will decrease in complexity in the future. Therefore, the computational complexity of machine intelligence systems is likely to increase in the future rather than diminish.

SUMMARY

Approaches disclosed herein allow for the conditional execution of a directed graph by a processing core in a computationally efficient manner that produces essentially the same result as a standard execution of the directed graph. One disclosed computer-implemented method for a conditional execution of a directed graph comprises storing a first data tile in a memory. The first data tile includes a first set of data elements. The method also comprises storing metadata in association with the first data tile. The method also comprises storing a second data tile in the memory. The second data tile includes a second set of data elements. The method also comprises fetching an instruction. The execution of the instruction requires an arithmetic logic operation using an arithmetic logic unit, a first data element in the first set of data elements, and a second data element in the second set of data elements. The method also comprises evaluating the metadata and conditionally executing the arithmetic logic operation based on the evaluating of the metadata. A conditionally executed output of the arithmetic logic unit resulting from the conditional execution of the arithmetic logic operation is not equal to a standard output of the arithmetic logic unit resulting from a standard execution of the arithmetic logic operation.

A disclosed processing core comprises a memory and a first data tile stored in the memory. The first data tile includes a first set of data elements and metadata stored in association with the first set of data elements. The processing core also comprises a second data tile stored in the memory. The second data tile includes a second set of data elements. The processing core also comprises an arithmetic logic unit configured to conduct an arithmetic logic operation using data from the first set of data elements and the second set of data elements. The processing core also comprises a control unit configured to evaluate the metadata and control the arithmetic logic unit to conditionally execute the arithmetic logic operation based on the evaluation of the metadata.

DETAILED DESCRIPTION

Figure 1:
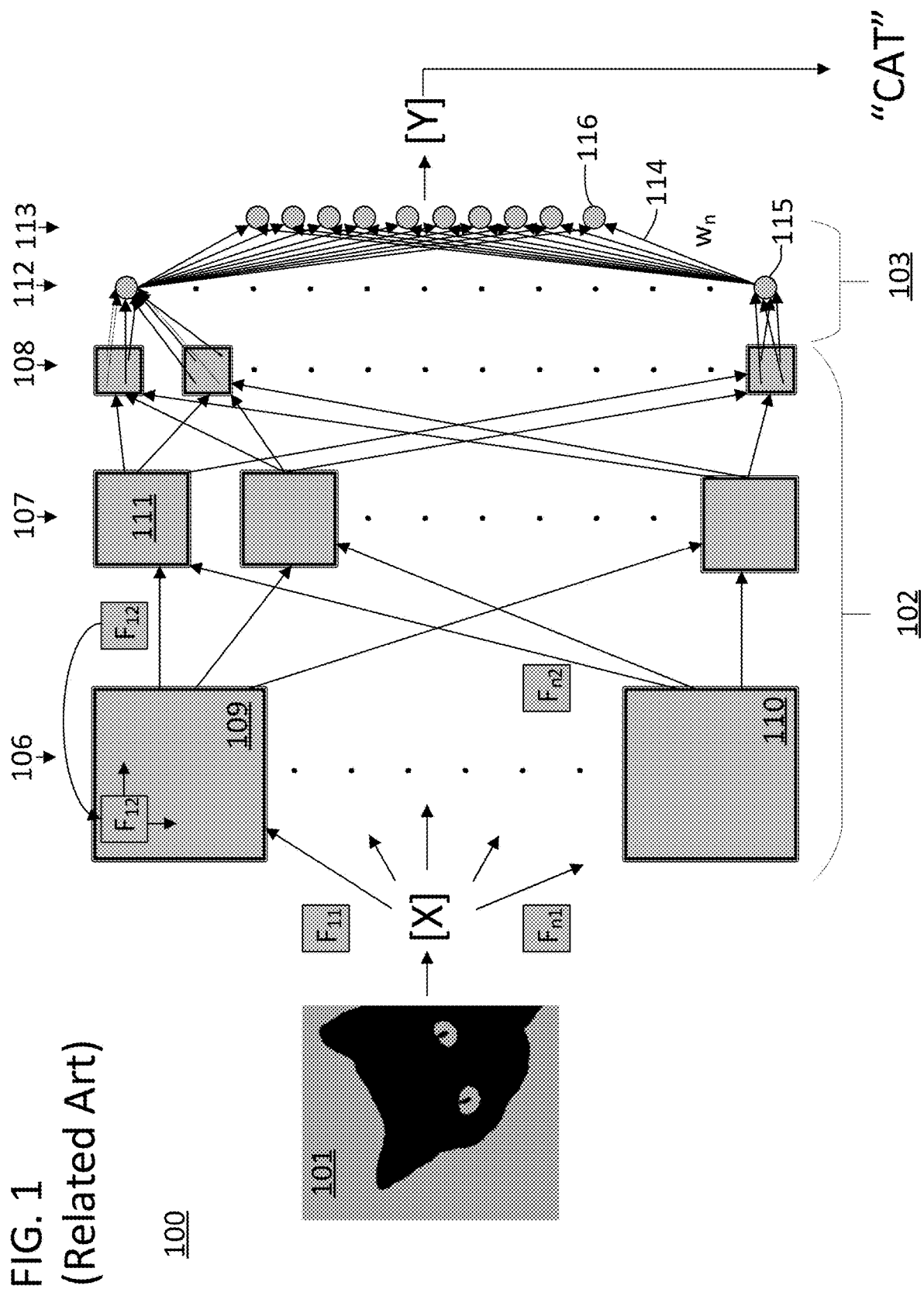
FIG. 1 includes a directed graph of an artificial neural network in accordance with the related art.

Approaches disclosed herein allow for the conditional execution of a directed graph by a processing core in a computationally efficient manner that produces essentially the same result as a standard execution of the directed graph. The approaches include a processing core and associated computer-implemented methods. The conditional execution can be actuated by a set of data that is separate from the data which constitutes the directed graph itself and the inputs and outputs thereof. The separate set of data can be metadata. The computational resources saved by performing the conditional execution of the directed graph instead of the standard execution of the directed graph are greater than the computational resources consumed in the generation, maintenance, and utilization of the metadata. At the same time, the result of the execution of the conditional execution of the directed graph is effectively equivalent to the result of the standard execution. A processing core can conduct a standard execution of the directed graph without any of the separate data. However, the conditional execution of the directed graph, as actuated by the separate data, can be more efficient than the standard execution.

In certain approaches, the data that constitutes the directed graph can be stored in tiles. The tiles can be considered storage containers for tensors that are used in instructions that execute a directed graph. The tiles, or at least specific data elements from those tiles, are retrieved from memory to execute the directed graph. For example, the instruction could be for the convolution of a tensor associated with an edge of the directed graph, stored in a first tile, and a tensor associated with a destination vertex of that edge, stored in a second tile. A kernel of the processing core could retrieve the data tiles from memory and apply them to an execution engine in response to receiving such an instruction. The size of the tiles could be dynamically modifiable to allow a single processing core to implement variant directed graphs in an efficient manner.

In approaches in which tiles are used to store the data that constitutes the directed graph, the separate data used to actuate the conditional execution of the direct graph can be stored relationally with the tiles. The separate data used to condition the execution of the directed graph can be stored in the tiles or in a separate data structure. For example, the separate data could be metadata stored in a header of the tiles, and the data that constitutes the directed graph itself could be stored in a body of the tiles. The data in the body of the tile can be referred to as the payload of the tile. As another example, the separate data used to actuate the conditional execution could be stored as a key pair with an identity of one of the tiles in a separate data structure. The separate data can be stored relationally in the same memory or on a different memory. In one approach, the separate data can be stored in a register of a processor core control unit. The register in question can be associated with the data in the tile via a known relationship between the address of the register and the position in the instruction pipeline in which the data tile will be used. For example, when the data values of a tile are updated, and the processing core instruction pipeline is currently queued to access the data in the tile again in three instructions, the separate data can be store in a register that is accessed whenever the third instruction from the present is executed. Essentially, the separate data and data in the tiles can be associated via synchronized stacks managed by a controller.

The conditional execution of the directed graph can include the conditional execution of an instruction. The conditional execution of the instruction can likewise include the conditional execution of arithmetic logic operations. In certain approaches, the conditional execution of the graph is defined by one or more conditional arithmetic logic operations that are substituted in place of one or more standard arithmetic logic operations. In certain approaches, the condition execution of the graph is defined by one or more standard arithmetic logic operations that are suppressed. The execution of a direct graph generally involves numerous instructions conducted to implement the edges of the directed graph. The instructions could be executed by an execution engine on the processing core. The execution engine could include multipliers, registers, adders, accumulators, ALUs, floating point units, and any other hardware required to execute an instruction in response to a command and produce a set of outputs in response to a set of inputs.

The instructions could be simplified in the conditional execution relative to the corresponding instruction in the standard execution of the graph. For example, the multiplication of two data elements could be conditioned and simplified by reducing the precision of the multiplication or by replacing one of the data elements with a similar value in a more basic format. As another example, operations used to implement an instruction could be inhibited in a conditional execution. Furthermore, the output of such operations could be replaced by pulling a fixed value from memory to serve as a substitute output to the output that would have resulted from a standard execution of the operation. This second class of approaches provides benefits not only in reducing the computational complexity of the operations that need to be conducted, but also by reducing the amount of data that needs to be moved through the system. If an operation is inhibited entirely, there is no need to move the input data from memory to the computational element that will execute the operation. The result of inhibiting operations entirely is a decrease in both computational complexity and memory bandwidth requirements. In accordance with this disclosure, the "conditional execution" of an instruction or operation includes inhibiting the instruction or operation entirely and providing a fixed output in place of the output that would have resulted from the standard execution.

The data used to actuate the conditional execution can be generated at numerous times relative to the data produced by the execution of the graph itself. In certain approaches, the data used to actuate the conditional execution is generated at runtime while the directed graph is being executed. The data can be generated as a by-product of the execution, or can be generated through an additional routine that executes while the directed graph is being executed. In other approaches, the data used to actuate the conditional execution is generated during a first simplified graph execution. Regardless, the cost of generating this additional data is less than the benefit derived from its use. The manner in which the data is generated can be controlled by hardware or software. However, benefits accrue to approaches in which the runtime hardware alone is used to generate the data. Generating the data in software could add instruction cycles to the processing core and it would thereby be difficult to realize the level of performance improvement required to justify the additional expense associated with generating the data in the first place.

The data used to actuate the conditional execution of the graph can also be utilized at numerous times relative to the time it was generated. The data can be generated during the execution of one layer of the directed graph and then can be used to condition the execution of a later layer of the directed graph. The data could also be generated during one execution of the directed graph, and could then be used during a subsequent execution of the directed graph with a different input. Consider a first execution of a directed graph with input Y that requires an instruction using tile X as an input. That first execution could generate metadata for tile X. Subsequently, tile X could be used as an input for an instruction during a second execution of the directed graph with input Z. The execution of that instruction could be conditioned using the metadata generated during the first execution of the directed graph. In similar approaches, the data used to actuate the conditional execution of the graph can be considered a property, or decoration, of the data tile itself. As such, anytime the directed graph data in the data tile is used in an operation, the data used to actuate the conditional execution of the graph that is associated with that data tile can be utilized and/or updated. Furthermore, the data can be generated during a first simplified execution of the directed graph, or a specific instruction necessary for the first simplified execution, and can be used to determine if a regular execution should have been conducted. For example, a specific instruction could be executed using lower precision than a standard execution, and the lower precision execution could generate metadata for a tile involved with the execution. The metadata could then be evaluated to determine if the same instruction should be replayed at a higher precision.

The example of a directed graph implementing an ANN provides an illustrative example throughout this disclosure of an application where conditional execution can lead to improved and more efficient performance. In such a case, the data elements of the tiles can include weight values, activation values, input values, filter values, or accumulation values of the ANN. The execution of the directed graph would thereby include numerous instructions and logical arithmetic operations on those values. For example, the instructions could involve multiplications between weight values and the outputs of a prior layer, or convolutions between filter values and values from a prior layer. The execution of the directed graph would thereby include instructions to conduct a matrix multiplication or convolution on two tensors to produce an output tensor.

ANNs benefit from conditional execution in accordance with certain disclosures herein because they are generally over-parameterized for any given inference. This is because ANNs are generally trained to work with many different potential inputs but only process one input at a time. For example, an ANN may be able to recognize multiple subjects in an input image, but only a small portion of the associated graph may respond in a meaningful way to any one subject. Different portions of the graph may acutely contribute to the output when the subject is a dog, and not contribute at all when the subject is a cat. As a result, a perfectly accurate execution of the lower priority portions of the directed graph would lead to wasted computations that do not contribute in a meaningful way to the generation of an accurate inference. By conditioning execution of the directed graph, only the portions of the data from the directed graph that are of importance for a particular inference are involved in high precision executions. The specific approach of placing the separate data used to actuate the conditional execution in the same data structure as the data used for the standard execution assures that the data is available when it is needed. Furthermore, it assures that such separate data can be efficiently updated when the results of a given execution involving its associated data is completed and its effect is measured.

Figure 2:
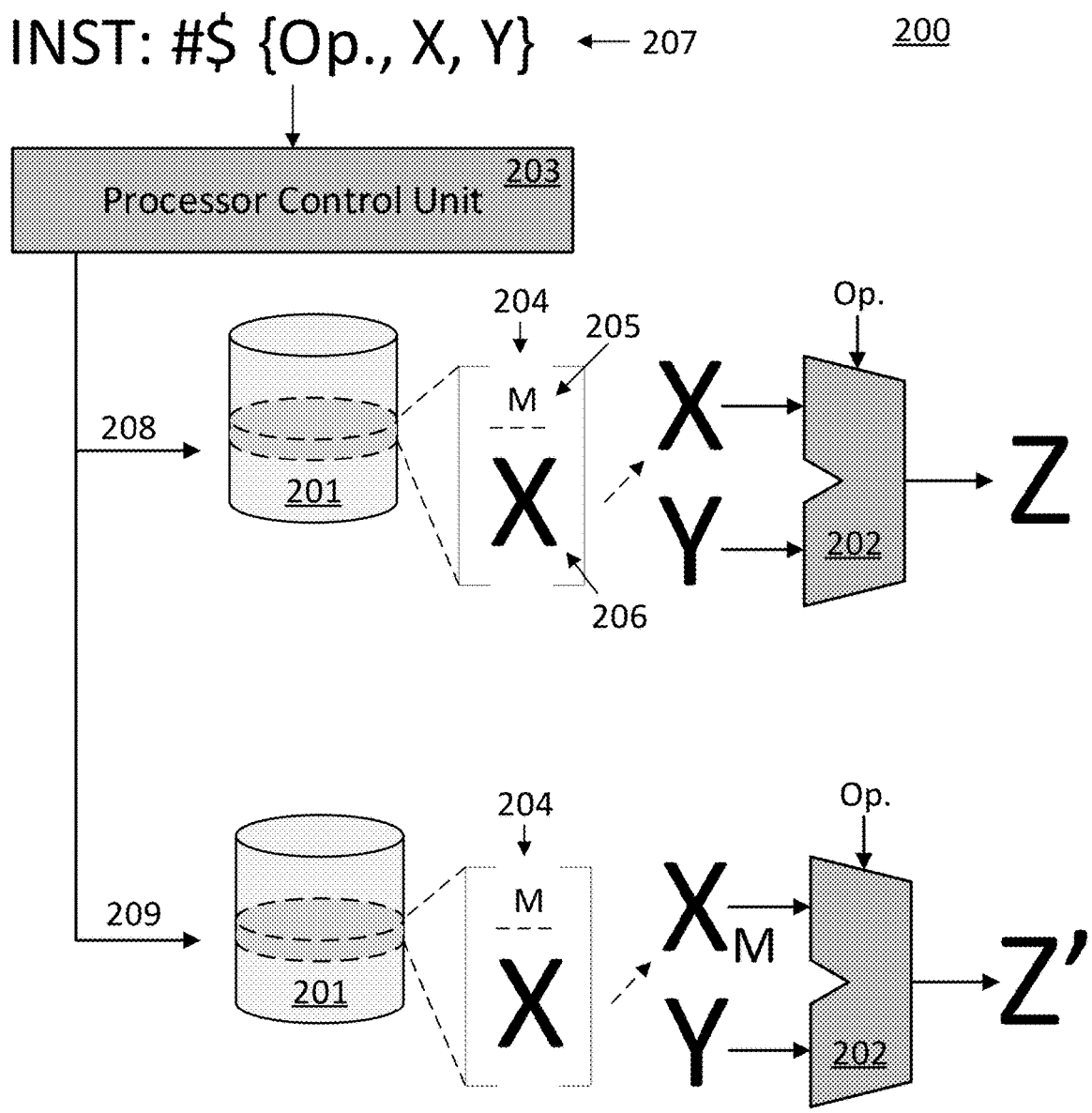
FIG. 2 provides a data flow diagram for a metadata actuated conditional execution of an arithmetic logic operation in accordance with some of the embodiments disclosed herein.
Figure 3:
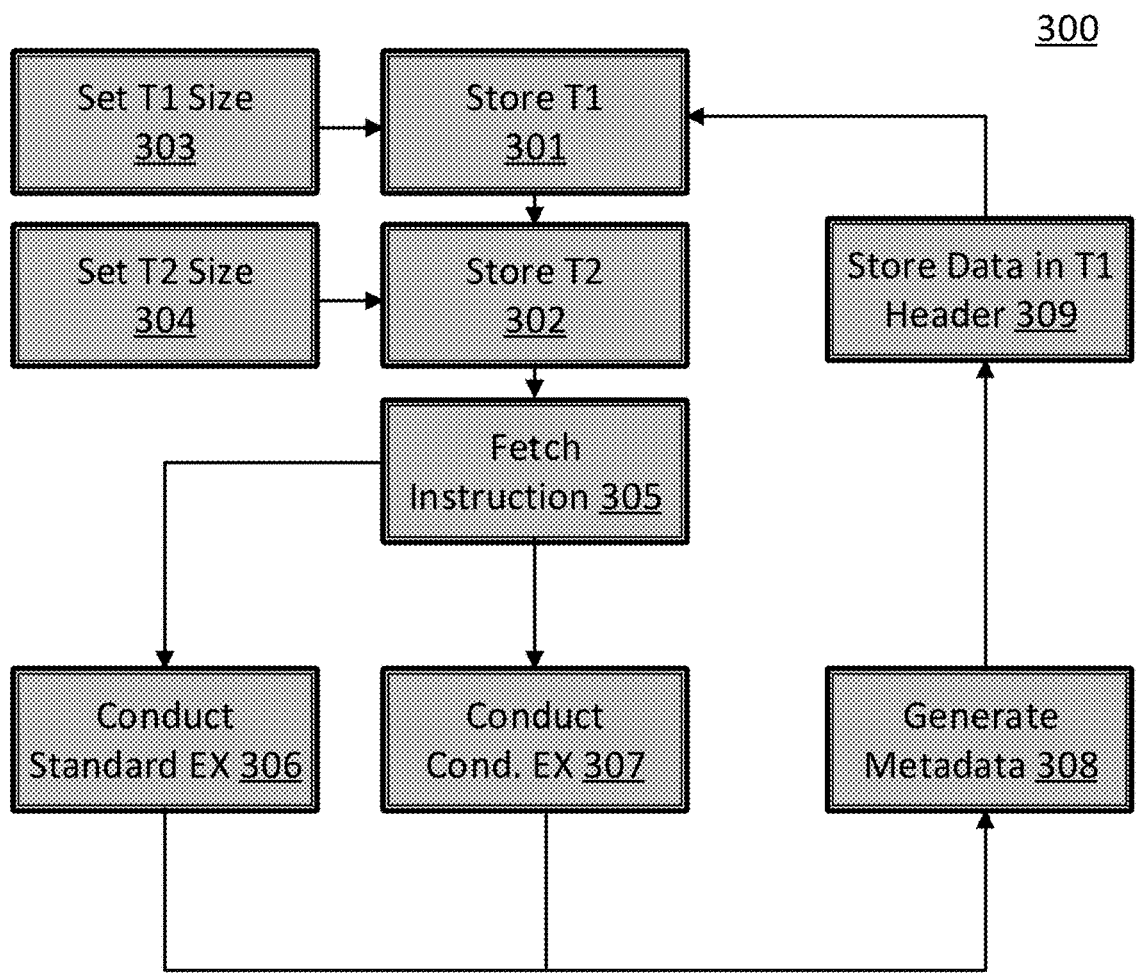
FIG. 3 provides a process flow chart for a metadata actuated conditional execution of an arithmetic logic operation and a data flow diagram of how that metadata can be generated in accordance with some of the embodiments disclosed herein.
Figure 3:
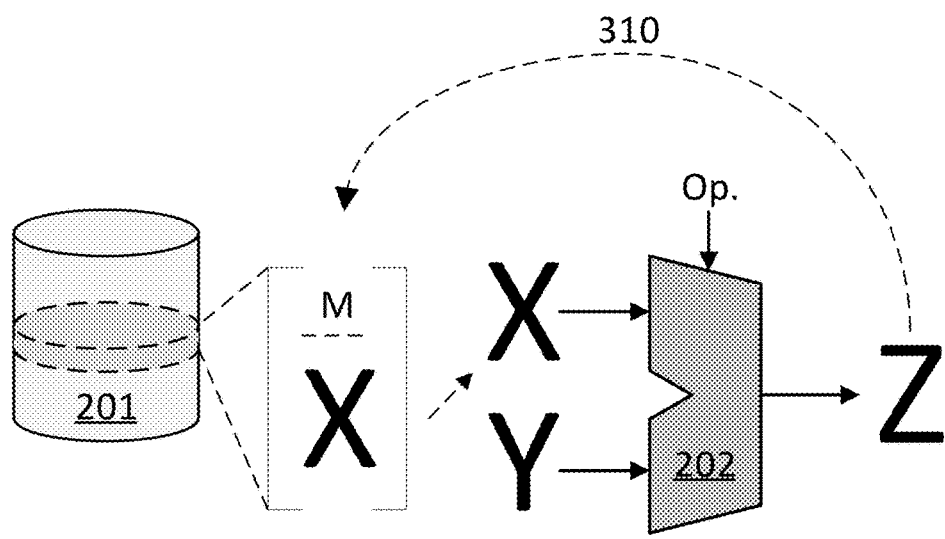

FIG. 2 and FIG. 3 include a data flow diagram 200 and process flow chart 300 that provide an example conditional execution of a directed graph by a processing core in accordance with some of the approaches disclosed herein. Data flow diagram 200 provides an illustration of two potential data flows that can be executed by a single processing core. The processing core includes a memory 201, an arithmetic logic unit 202, and a control unit 203. The term "arithmetic logic unit" as used herein is not limited to hardware that is only equipped to conduct integer arithmetic and is meant to include hardware that can conduct floating point arithmetic. Like elements are referred to using the same reference numbers. For the avoidance of doubt, data flow diagram 200 illustrates the data flow for two different arithmetic logic operations conducted at separate times, and the two instances of memory 201 and arithmetic logic unit 202 are not separate physical instances on a processing core. Memory 201 stores data tiles that are used to execute a directed graph. As such, method 300 includes a step 301 of storing a first data tile in a memory and step 302 of storing a second data tile in memory. The data tiles are used during the execution of the directed graph.

Data tiles used in combination with the approaches disclosed herein can be contiguous blocks of memory in a memory on a processing core. The data tiles can alternatively or in combination be portions of a memory that are addressable by a single physical or virtual address. The data tiles can store a set of data elements. The data elements can be integer variables. The data elements can be fixed point or floating point variables. The data elements can be binary true/false or plus/minus variables. The data tiles in a memory can vary in size from tile to tile at any given time. The size of a specific tile can also fluctuate temporally in response to commands received from a controller. The header of the data tile can include metadata used to condition execution of the directed graph. The body of the data tile can include data elements that form the content of a directed graph. The body and header of the data tiles can be stored contiguously in memory such that the content of the directed graph and metadata are accessible from a single memory address. However, the metadata can also be stored relationally to the tiles in a separate data structure that is independently accessible. The size of the data tiles can be set by a software controller or entirely by hardware on the processing core. As such, method 300 includes steps 303 and 304 which involve setting the size of the first and second data tiles.

FIG. 2 illustrates a data tile with a tile header 205 in addition to a body 206. The body can include a set of data elements. In approaches in which the tiles are used for the execution of a directed graph, the set of data elements can be directed graph data elements. As used herein, directed graph data elements are data elements that are required for the complete execution of a directed graph. The directed graph data elements can be tensors such that the tiles are effectively tensor storage containers. The data in tile header 205 can be separate data that is separate from the directed graph data elements in that it is not required for the complete execution of the directed graph. The data in the tile header can be metadata. The separate data in the header can be used by the processing core to indicate that an operation utilizing data from the body of its tile should be conditionally executed. The separate data in the header can, in the alternative or in combination, be used by the processing core to conditionally execute an operation in lieu of the data in the body of the tile. In keeping with the tradeoff associated with maintaining the separate data and realizing an improvement in performance attributable to use of the separate data, benefits accrue to approaches in which header 205 is smaller than payload 206 by a factor of 4 or greater. In specific approaches, header 205 is smaller than payload 206 by a factor of 7. For example, the tile could have a total size of 1024 bytes, and the header could be 128 bytes or less. In approaches in which the tiles and metadata are stored in separate data structures a similar scaling factor between the overall data structures produces similar benefits.

In the example of a directed graph implementing an ANN, the directed graph data elements can be weight values, activation values, input values, filter values, or accumulation values, of the ANN. In the case of an ANN, it can be beneficial to adjust the size of a data tile dynamically as the same processing core is used to implement different ANNs with differently sized layers, filters, etc. In some approaches, the size of the data tiles can be set by a software controller and can be adjusted by a programmer on a global, set, or individual tile basis. In the case of an ANN, the size of each title may be larger than a single ANN data element, such as a single neuron's weight value, but will generally be smaller than a complete layer of the ANN. As such, the manipulation of the tile data requires fewer address look ups than an execution in which elements are addressed individually, but also provides improvements in computational efficiency owing to the ability to break a layer into pieces that are manipulated independently. For example, a tile could serve as storage container for a sub-tensor of a tensor that defined an entire layer or filter in the ANN.

The data tiles can be used to execute a directed graph in accordance with an instruction stored in a computer-readable non-transitory medium on the processing core. The instruction can be part of an instruction sequence fora standard execution of the directed graph. For example, the instruction could be a complex hardware sequence with tensors as inputs and outputs. The instruction could be for a convolution or matrix multiply of those inputs and produce a tensor as an output. To use the example of an ANN, the inputs could be a set of weight values for a layer of the ANN and a set of input values to that layer, the operation could be a matrix multiplication of those values, and the output could be a tensor that formed part of an input to the next layer in the ANN. The same instruction can, at different times, result in either the standard execution of a given operation or a conditional execution of that operation. In accordance with certain approaches disclosed herein, the conditional execution can be more efficient that the standard execution.

In FIG. 2, the instruction 207 is represented in mock assembly code and includes a single operation "Op.", and the identity of at least two data elements "X" and "Y." As such, the instruction results in the execution of an arithmetic logic operation. For example, the instruction could cause the identity of the arithmetic logic operation "Op" to be delivered to the control input of an arithmetic logic unit and two data elements to be delivered to the operand inputs of the arithmetic logic unit. In the illustrated case, the inputs to ALU 202 come from the set of data elements X and Y. Set of data elements Y can include any data element. However, in certain cases, set of data elements Y will be obtained from the body of a second tile stored in memory. The nontransitory medium on which instruction 207 is stored could be the same memory as the memory on which the first and second tiles are stored. However, the tiles and instructions could also be stored on different cache levels on the processing core.

FIG. 3 includes a step of fetching an instruction from memory 305. The instruction can be instructions 207 from FIG. 2. The instruction can then be acted upon by a processor control unit such as processor control unit 203 in FIG. 3. FIG. 3 illustrates how two separate data flow paths can extend from the execution of step 305 (e.g., either a standard execution step 306 or a conditional execution step 307). During a standard execution, processor control unit 203 will direct data flow through data flow path 208. As illustrated, a standard execution of the arithmetic logic operation indicated by instruction 207 involves at least one data element from a first set of data elements X provided in combination with at least one data element from a second set of data elements Y to ALU 202 to generate output Z. During a conditional execution, control unit 203 could alternatively have directed data flow through data flow path 209. As illustrated, the conditional execution produces a different output Z'. This is because the data element delivered to ALU 202 is $X_M$ which is a version of the data element from the first set of data elements X that has been altered based on metadata M. The various way in which the metadata can actuate a conditional execution are discussed in more detail below. In particular, the conditional execution could involve foregoing an operation or set of operations all together.

The separate data used to condition execution of a directed graph can be generated during executions of the directed graph. In some approaches, separate data used to condition a later execution of a specific operation can be generated during a prior execution of that same specific operation in a prior execution of the entire direct graph. For example, the execution of an operation using tile X during a first execution of directed graph at time "t" could generate metadata that is used to condition the execution of an operation using tile X during a second execution of the same directed graph at time "t+1." As another example, the execution of an operation used to produce tile X during a first execution of a directed graph at time "t" could generate metadata that is used to condition the execution of an operation using tile X during a second execution of the same directed graph at time "t+1." In some approaches, separate data used to condition a later execution of a specific operation can be generated during the execution of an upstream operation in the same execution of the directed graph. For example, metadata generated for an output tile for a layer 2 operation could be used to condition the execution of a layer 3 operation where the layer 3 operation used that output tile as an input. The prior execution can be a standard execution, a conditional execution, or an execution of a simplified version of the directed graph. The simplified version of the directed graph can be derived and executed using any of the approaches disclosed in U.S. Pat. App. No. 62/483,133 filed on Apr. 7, 2017, which is incorporated by reference in its entirety herein for all purposes. The separate data can, in some cases, be generated as a side effect of these prior executions, and can be used to populate the tiles to essentially "decorate" tile sized chunks of the directed graph with additional information. The additional information can take on many forms and can be used to cause and/or effect conditional execution as described in more detail below. A specific example of this process is provided in the remainder of FIG. 3.

The data generated during prior executions can be stored as the metadata of the tiles involved in those prior executions. The metadata can provide an indication as to the relative importance of an operation involving the tiles to the overall execution of the directed graph. In certain approaches, prior executions allow the processing core to generate information concerning which portions of a directed graph are strongly active at runtime and to prune out computations related to portions of the direct graph that are not strongly active or that do not strongly contribute to the outcome of the directed graph. For example, tiles with metadata indicating the tile is of "low" priority could be pruned out while tiles of "high" priority could be subjected to a standard execution. For example, the metadata could be a flag indicating that a specific tile was of "high" or "low" priority, and the execution engine could condition the execution of operations involving those tiles accordingly. As another example, the metadata could be a numerical value that indicated the relative priority of a given portion of the directed graph as a "10" to indicate a high priority relative to a different portion with a numerical value of "6.32" to indicate a moderate priority. The priority values could then be used to condition the accuracy of any operation conducted using those specific tiles. In other approaches, the metadata could be an approximation of the data in the tiles or an approximation of the outcome of an operation or set of operations involving the tiles. For example, the metadata could include an average of the outputs of all operations involving the data in the past so that the average could be provided in the future as a substitute for conducting an operation using the actual data in the tile. As described in more detail elsewhere in this disclosure, the metadata could be indicative of the data in the tiles or an approximation of the data in the tiles. For example, the metadata could be a flag indicating that all, or a substantial portion, of the values in the tile were zero or some other number. As another example, the metadata could be a highly down-sampled version of the data in the tiles.

Flow chart 300 includes a step 308 of generating metadata. This metadata can be derived from the output of the arithmetic logic operation as shown by data flow line 310. The data can be generated as a by-product of the execution in steps 306 and 307, or can be generated through an additional routine that executes while the directed graph is being executed. The metadata can be generated solely using a set of hardware elements of the processor core. Alternatively, the metadata can be generated using a software controller. As the metadata is generated as a byproduct of prior executions regarding a portion of the directed graph it is well suited to provide an indication as to the importance of that portion of the directed graph to the overall execution of the directed graph. The metadata generated in step 308 can be stored in the header of the tile as in step 309. Alternatively, the metadata can be stored in a separate data structure. The tile can then be reused later with the metadata providing additional information used to actuate a conditional execution.

As illustrated, the metadata for a tile is generated by the standard execution of an operation involving the data in the body of the tile. However, the metadata can also be initially generated or updated during a conditional execution involving the tile, or during an operation involving a wholly separate tile. The metadata can also be continuously updated every time an associated tile is used, periodically updated with less frequency, or can be set once when a specific directed graph is instantiated and then fixed until a different graph is instantiated by the processing core or an associated tile is deleted. In certain approaches, the metadata could also be set by a programmer using a software controller across the entire core on a global, set or individual tile basis.

The separate data from the directed graph data can take on variant forms depending upon how the conditional execution will proceed. The separate data can actuate conditional execution be either indicating that a conditional execution should be executed, indicating a particular class of conditional execution that should be executed, or actually containing substitute directed graph data that should be used during the conditional execution. For example, metadata of a tile can include a power value for the tile payload, a mean and variance for the values in the tile payload, a power value combined with a white noise distribution, an approximate spectrum of the tile, a heavily down-sampled version of the tile, or a histogram of values in the tile. The down-sampled version of the tile could indicate that the body of the tile, or portions thereof, where null or zero values. In such cases, the metadata could be a series of flags indicating if different portions of the tile were all zero value or some other fixed number. A flag indicating that the tile, or a portion thereof, included all zero values is referred to herein as a zero flag. In one example, the metadata could be a histogram of floating point exponent values for the data elements in the payload could be used. As another example, the metadata could be a simple flag indicating a type of conditional execution that should be conducted with the tile, or a flag indicating how important the tile is to the overall execution of the directed graph (e.g., "low", "medium", or "high"). A separate system could then condition the execution based on that priority level.

The separate data could be a set of subsets of separate data with a one-to-one correspondence with portions of the directed graph data. For example, metadata of a tile could include sets of entries that are specific to individual portions of the tile payload. The subsets of data could be individually accessible to the hardware, firmware, or software controller tasked with generating and managing the separate data. The subsets of separate data can take on any of the variant forms described in the prior paragraphs. The subsets of separate data can be sets or entries of metadata stored in a data tile.

In some approaches using data tiles with metadata, the data tiles have a programmable correspondence between the metadata and directed graph data of a data tile. As mentioned elsewhere herein, the ability of a tile to adapts its size relative to the data of the directed graph provides specific benefits in terms of increasing the ability of a processing core to efficiently access data from memory and execute the directed graph. Similarly, the metadata of the tile can be configured to have a variable and programmable correspondence with portions of the tile payload. As a result, the determination of the need to conduct a conditional execution and/or the actual conditional execution itself can be improved in the same way. If the subset of the metadata is an abstract of a portion of the directed graph data, and that portion of the directed graph data is required for a computation, that abstract can instead be individually accessed when it is time to execute the computation. If the subset of metadata is indicative of the relative priority of the corresponding directed graph, or is otherwise amenable to an evaluation of whether conditional execution should take place, only that subset of metadata needs to be accessed to conduct that evaluation. The fact that the metadata is compartmentalized according to how the corresponding directed graph data is used during execution thereby leads to significant efficiency gains.

The portions of a data tile payload that correspond with the portions of metadata could be portions of directed graph that are used as a group in a computation required to execute the directed graph. These approaches are beneficial in that the sets of entries in the metadata associated with that group of directed graph data could be individually evaluated and accessed when the computation associated with that directed graph data was scheduled to execute. In the specific example of a directed graph implementing an ANN, an exemplary group of directed graph data could be a filter of a CNN. A more specific example relevant to ANNs is provided below with reference to FIG. 4.

Figure 4:
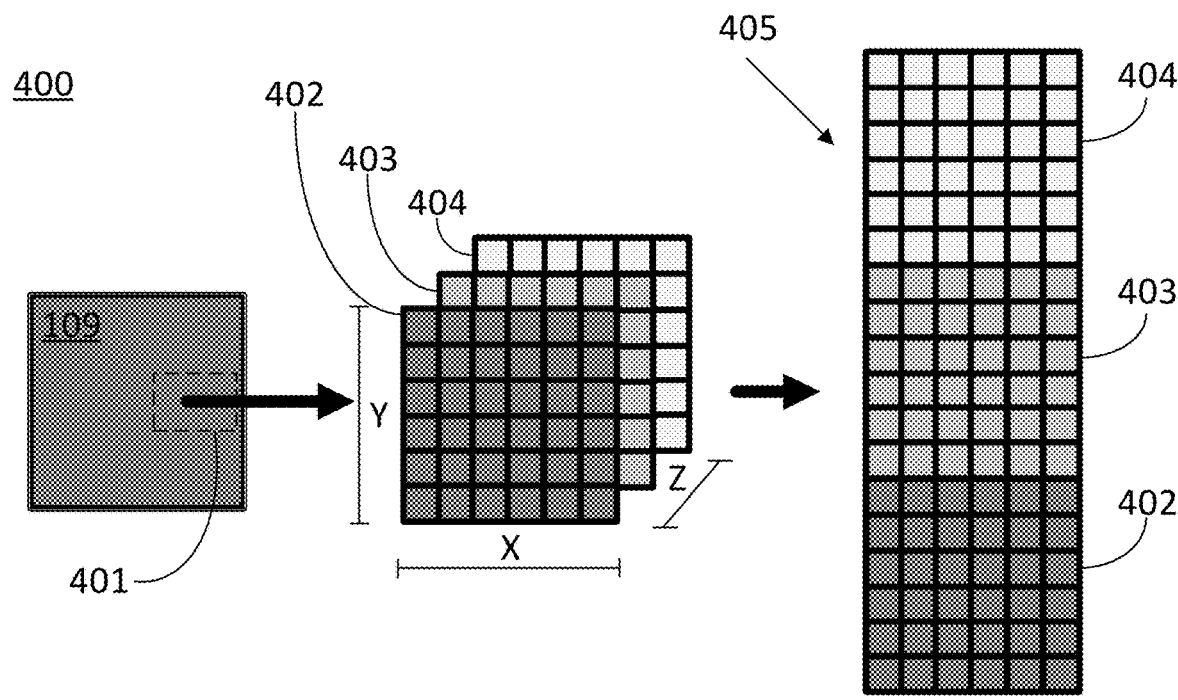
FIG. 4 provides an illustration of the relationship of a data tile, including the metadata and payload of the data tile, to a directed graph that requires the data tile for execution in accordance with some of the embodiments disclosed herein.
Figure 4:
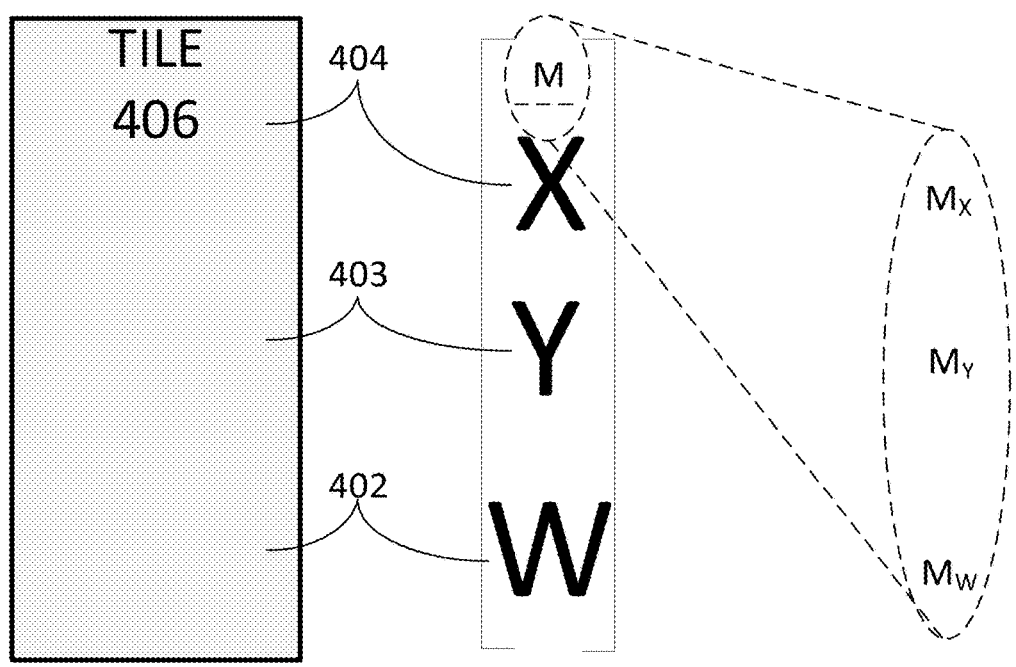

FIG. 4 provides an illustration of how metadata can be associated with specific portions of a data tile to facilitate the efficient execution of a directed graph that represents an ANN. In FIG. 4, tensor 109 is an input tensor to a layer in a CNN which will be used in a convolution operation during the execution of the directed graph to which is it a part. In the illustrated case, tensor 109 is a three-dimensional tensor. As such, a portion 401 of tensor 109 can be represented by "z" two-dimensional matrices 402-04. In this illustrated simplified case, the dimension of tensor 109 in the z-direction is three which is why 3 two-dimensional matrices are needed. However, this approach is not limited to three-dimensional tensors and can operate with tensors whose higher-level dimensions have domains orders of magnitude larger than three. The size of the tensor in the x and y domains are 6 and 6 respectively as represented by each of matrices 402-404. In a practical application, these numbers could each range into the millions or billions. Each individual matrix 402-404 can be referred to as an "x-y plane" of tensor portion 401. The squares in matrices 402-404 represent individual directed graph data values. The values could be represented in memory using data types and precision levels equal to that of the individual data elements of a data tile in the processing core. The matrices can be arranged in memory end-to-end according to data structure 405.

Multiple portions of directed graph data can be stored in a single data tile. As illustrated in FIG. 4, data tile 406 can be instantiated to store data structure 405 as the payload of the tile. Data tile 406 can be instantiated by a software controller or firmware of the processing core. Each x-y plane 402-404 is a portion of the directed graph data stored in the payload of tile 406. The x-y planes 402-404 have a one-to-one correspondence with a set of subsets of separate data. As illustrated, the subsets of separate data are multiple entries $M_X$, $M_Y$, $M_Z$, in the metadata M of tile 406. As will be described below, having individual entries for the metadata partitioned in this manner relative to data structure 406 is advantageous in that all the data in the corresponding portion of the data structure tends to be used in the same manner by the processing core. In a specific implementation the subsets of separate data can be zero value flags indicating that a corresponding x-y plane includes all zero values. In another example, the subsets of separate data can be priority values indicating an estimate for how much the corresponding x-y plane will contribute to the execution of the directed graph. Furthermore, the subsets of separate data can take on any of the characteristics mentioned above regarding the metadata of a data tile.

Figure 5:
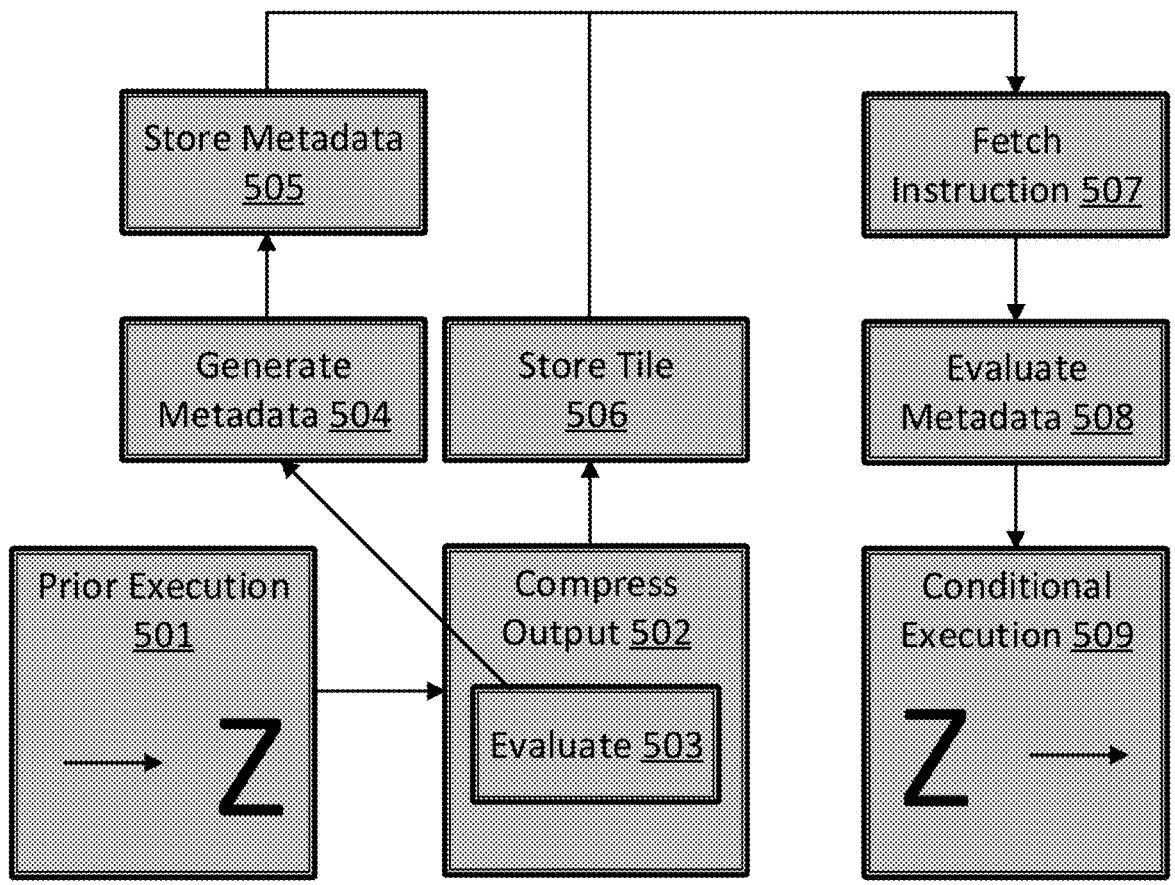
FIG. 5 provides a data flow diagram and corresponding process flow chart for the generation of metadata for conditional execution of a directed graph which leverages the output of a compression engine in accordance with some of the embodiments disclosed herein.
Figure 5:
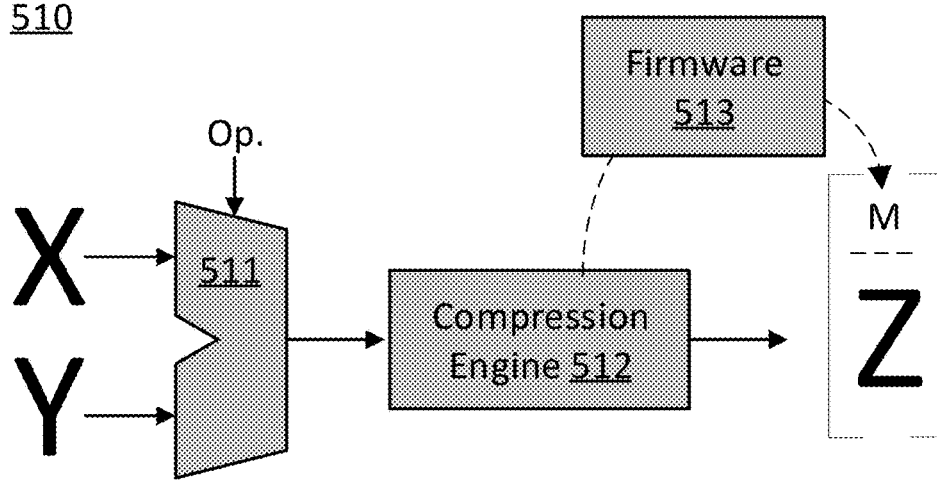

As stated previously, the metadata for a tile can be generated as a byproduct of the processing conducted by the processing core. For example, the output of an operation by a logic element in the processing core involving a given operand can be analyzed as the output of the operation is being generated, and the metadata associated with that operand, or the metadata associated with the output of the operation can be updated based on the analysis. In a more specific example, as the output of an operation is being compressed for storage, the compression engine can generate information regarding the sparsity and/or non-sparse values of the data which can be processed and stored as the metadata of a tile. FIG. 5 provides a specific implementation in keeping with this family of approaches.

FIG. 5 includes a flow chart 500 for a set of methods and a data flow diagram 510 to illustrate the principle described in the previous paragraph. As illustrated, an ALU 511 is conducting an operation Op. on operands X and Y. This step of the process is represented in flow chart 500 by step 501. The execution associated with step 501 can be a standard or conditional execution. Regardless, a compression engine 512 can take the output of ALU 511 and compress it before it is returned to memory. The compression engine 512 can read the values of the output from math accumulation buffers or other intermediate circuit elements instead of directly from an ALU 511 as will be understood by those of ordinary skill in the art. This step of the process is represented in flow chart 500 by step 502. The compression engine can be in accordance with any data compression system including those that use run length encoding and other methods. In a specific example, the compression engine will be the compression system described in U.S. Pat. App. No 62/683,205, filed on Jun. 11, 2018 which is incorporated by reference in its entirety herein for all purposes. The compression engine can be instantiated entirely by hardware elements of the processing core such as logic gates, flops, registers, and other elements.

The processing core can generate metadata for the payload of a tile while the payload is being compressed for storage by evaluating the output data during the compression. This step is illustrated in flow chart 500 by step 503. As compression generally requires an evaluation of the data in volume, work can be saved by using the same evaluation to generate metadata for conditioning the execution of a directed graph to which the data volume is a part. For example, some compression systems determine a degree of sparsity or run length of a series of sparse values in a data volume. The evaluation can involve evaluating a set of non-sparse data values in the set of output data during the compression with an eye towards counting and compressing the non-sparse data values. As the degree of sparsity of an operand correlates with the impact the operand will have on an operation to which it is applied, the same evaluation used to determine the degree of sparsity or run length of a series of sparse values can thereby be used to generate metadata for conditionally executing the directed graph. The step of generating metadata is shown as step 504 in flow chart 500. In a specific example, the evaluation of the output can determine that a portion of the output data is all sparse values. The sparse values could be zero or null values. The portion of the output data could be the entire segment of output data or sub-portions that were known to be used in computations of directed graph data in combination. The evaluation in step 503 can be conducted as part of compression engine 512, purely in hardware, using the firmware of the processing core, or using a software controller. In a specific approach, the compression engine 512 can be implemented entirely in hardware, and firmware of the processing core 513 can be configured to "snoop" the data in the compression engine 512 and generate the metadata.

Step 504 can involve the generation of multiple elements of metadata with a one-to-one-correspondence with portions of directed graph data. For example, with reference back to FIG. 4, the evaluation in step 503 could determine that an entire x-y plane of data structure 405 such as matrix 404 comprised zero values. The corresponding metadata could then be a zero-value flag used to indicate this occurrence. The metadata for tile 406 generated in step 504 would then be a series of zero value flags indicating whether the corresponding x-y plane was entirely zero valued. The series of zero flags and the corresponding x-y planes could have a one-to-one correspondence. As the step of compressing the data 502 likely involves an evaluation or count of the number of sparse values in the data element, the metadata for conditional computation can be accordingly generated with low overhead.

The metadata generated in step 504 can be stored in a step 505. The compressed output data generated in step 502 can be stored in a step 506. These steps are reflected with the continuation of data flow diagram 510 in which the directed graph data Z is stored in the payload of a data tile while metadata M is stored in the header of the data tile. As such, step 505 and step 506 can be executed simultaneously with the metadata being stored in the tile. However, the metadata can also be stored relationally, but separate from the tile in the processing core, and steps 505 and 506 can be executed separately. Regardless, the process can continue with steps similar to steps 305 and 306 in FIG. 3. Specifically, an instruction that utilizes the data stored in the tile can be fetched in a step 507, and the metadata can be evaluated in a step 508 to determine if any operation implicated by the instruction should be conditionally executed. The metadata can be evaluated by hardware of the processing core, by firmware processing core or by a software controller. For example, the controller of a processing core could access a local register in which the metadata associated with the instruction was previously stored. In specific approaches, the operation will be conditionally executed in a step 509.

A specific example of an evaluation of metadata in step 508 and conditional execution in step 509 can be described again with reference to data structure 405 from FIG. 4. The instruction fetched in step 507 could request the convolution of an x-y plane stored in data structure 405 with a filter. In this example, the x-y plane in question could be all null values such that the output of the convolution of the x-y plane with any filter would be zero. Accordingly, the evaluation of metadata 508 could involve determining that the metadata included a zero-value flag stored in association with the x-y plane in question. This process could involve identifying the flag and its corresponding x-y plane. In furtherance of this example, conditional execution 509 could involve the suppression of the retrieval of that x-y plane from memory, the suppression of the execution of the computations associated with the x-y plane, and the provisioning of a null value in place of the output requested by the instruction. In this example, the overhead of generating the zero flag may have been close to zero given the fact that the compression engine 512 necessarily had to evaluate the sparsity of the output, and the computation resources saved can be quite large given all the primitive computations required to carry out a convolution between a filter and a large data structure.

Figure 6:
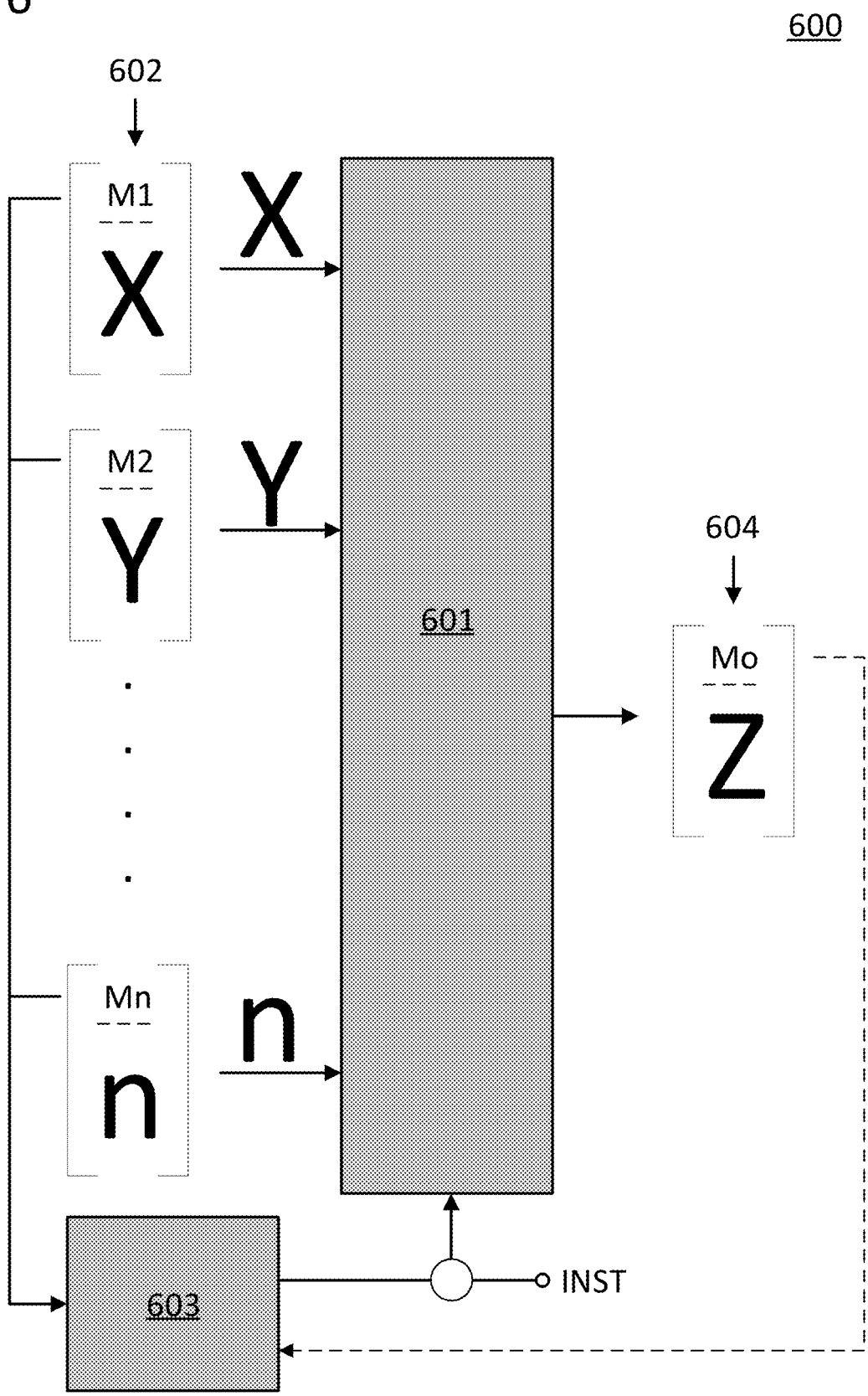
FIG. 6 provides a data flow diagram for a metadata actuated conditional execution of an instruction used to execute a directed graph in accordance with some of the embodiments disclosed herein.
Figure 7:
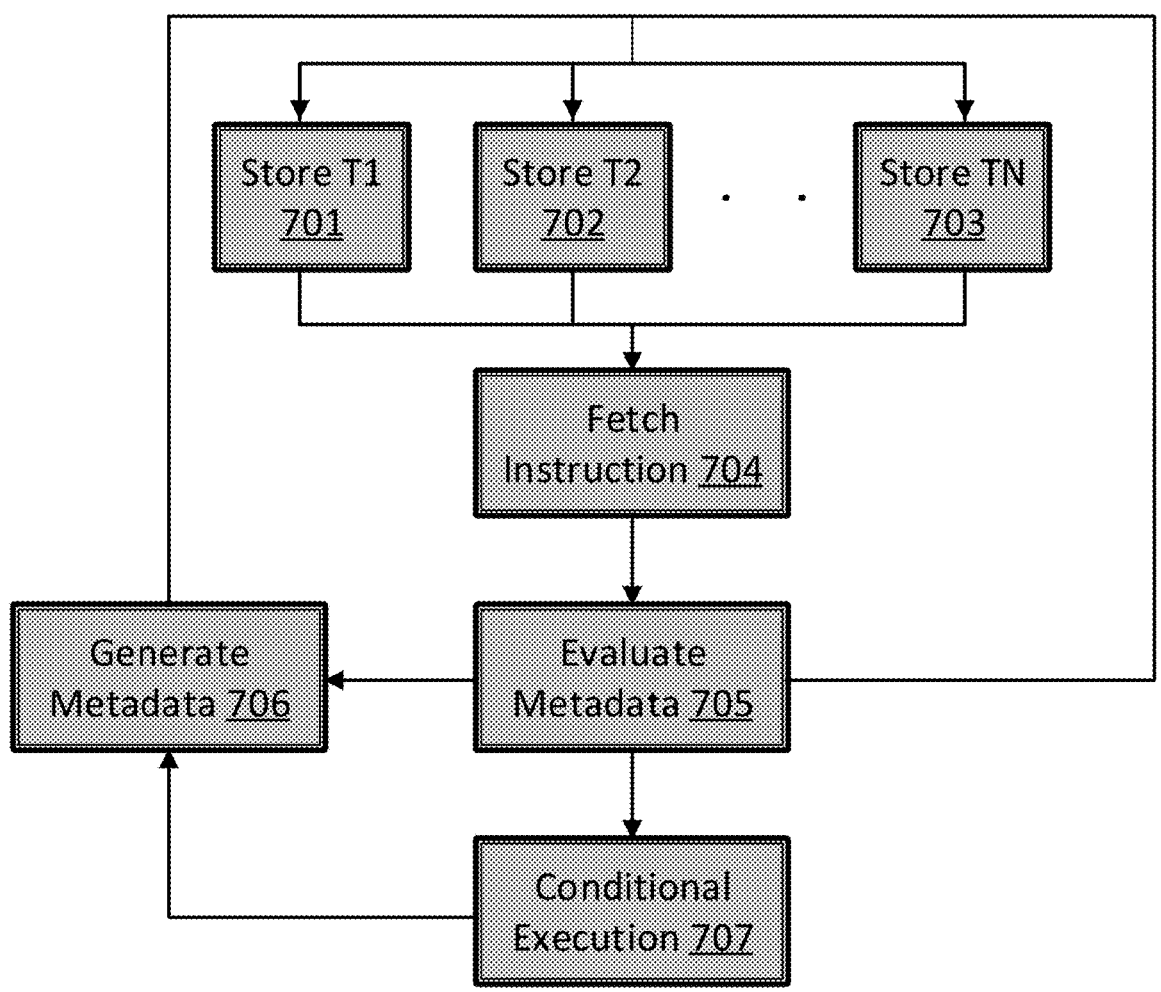
FIG. 7 provides a process flow chart for a metadata actuated conditional execution of an instruction used to execute a directed graph in accordance with some of the embodiments disclosed herein.

FIG. 6 includes dataflow diagram 600 for a metadata actuated conditional execution of an instruction used to execute a directed graph. Execution engine 601 includes n operand inputs and, in the illustrated example, receives the entire payloads of tiles 602 in the form of multiple tensors X, Y . . . n. Execution engine 601 represents a complex collection of hardware that is utilized by the processing core to execute instruction INST in accordance with certain approaches disclosed herein. For example, the execution engine can include multipliers, registers, adders, accumulators, and other logic, and can use that circuitry to generate output data from input data in response to received control inputs. The control inputs can be derived from the low level kernel instructions of the processing core as provided by control logic 603. Control logic 603 is able to condition execution of instruction INST based on a review of the metadata in all, or a sub-selection of, tiles 602. Furthermore, control logic 603 can condition execution of instruction INST based on a review of the metadata in output tile 604 that was stored prior to the execution of instruction INST, such as from a prior execution of instruction INST. The functions executed by logic 603 can be executed entirely in hardware on the processing core. However, the functions can be programmed by a software controller. Furthermore, the functions of logic 603 could both be programmed and executed by a software controller.

Flow chart 700 beings with steps 701, 702, and 703 where multiple tiles are stored in memory. In flow chart 700, a set of tiles greater than 3 are involved in the execution of a single instruction. The flow chart continues with step 704 in which an instruction is fetched for execution. The instruction could include any number of basic or complex operations to be conducted on the set of tiles. In step 705, the metadata of any or all of the tiles are evaluated to determine how the instruction should be executed. In certain cases, the instruction will be conditioned by foregoing the instruction entirely which returns the process to the step of storing the tiles. However, the flow chart can also proceed to step 706 in which additional metadata is generated. Step 706 step can be executed regardless of whether the instruction is executed or not. If the instruction is to be executed based on the evaluation in step 705, the flow chart continues with a step 707 of conditionally executing the instruction. During the conditional execution, metadata can be generated and stored via step 706.

The analysis of metadata used to condition the execution of an instruction, and the manner in which that instruction is conditionally executed, can be complex in nature. The analysis can involve an evaluation of the metadata of multiple tiles and the conditional execution can involve different tiers of conditioning. With reference to FIG. 6, the evaluation in step 705, as conducted by logic 603, could involve metadata M1, M2, and Mn. Furthermore, the conditional execution in step 707 could involve replacing all the values of n with fixed values, replacing all the values of Y with lower precision data elements, or any combination of the conditional execution techniques disclosed elsewhere herein. The following pseudo code gives a further example of how the execution could be conditioned. Programmatic conditional execution in accordance with this example could be executed in accordance with source code written by a programmer to allow a software controller to execute the conditional computation, or it could be implemented directly in hardware. The pseudo code could be implemented in a state machine or micro code below software level.

Z=function_compute_Z(X, M1, Y, M2, . . . n, Mn){plan=decide_plan_based_on_metadata (M1, M2, . . . Mn);
   if (plan==Output_Zeros) Z=0
   else if (plan==Output_Metadata) Z=M1
   else if (plan==Lower_Precision_Compute Z)= convolve_8b (X, Y, . . . n)
   else Z=convolve_16b (X, Y, . . . n);}

The pseudo code above shows how execution engine 601 and control logic 603 can be used to implement a nuanced conditional execution of instruction INST. In the pseudo code, INST is a 16-bit convolution of all the tensors input to execution engine 601. The pseudo code first determines a plan based on the metadata. Based on the plan, the pseudo code will either output a zero set for Z, replace Z with data from metadata M1, conduct an 8-bit convolution of the inputs, or conduct the standard execution. Any variation on this programmatic specification of the conditional execution of instruction INST is possible. The relationship between the metadata, the output data, and the instruction can follow complex functions. As stated previously, the plan can also be generated using metadata from the output tile Z, or any other tile in the system.

As stated previously, the metadata used by logic 603 does not need to be stored continuously with tiles 602 and it can be generated in numerous ways. For example, metadata M1 . . . Mn, and Mo can be generated from a previous standard, or conditional, execution of INST. Alternatively, metadata M1 . . . Mn can be generated from a prior execution that generated the current values of tensors X, Y, and n. To return to the example of a directed graph used to implement an ANN, metadata M1 . . . Mn can be generated during the execution of a prior layer of the ANN, and metadata Mo can be generated during the execution of the current layer of the ANN. Any combination of these possibilities is possible, such as metadata Mo being generated during a prior execution of INST, and M1 . . . Mn being generated during the execution of an instruction associated with a prior layer. In accordance with this programmatic implementation of how conditional execution is actuated, any metadata stored in the processing core when INST is executed can be used to condition the way INST is executed.

Figure 8:
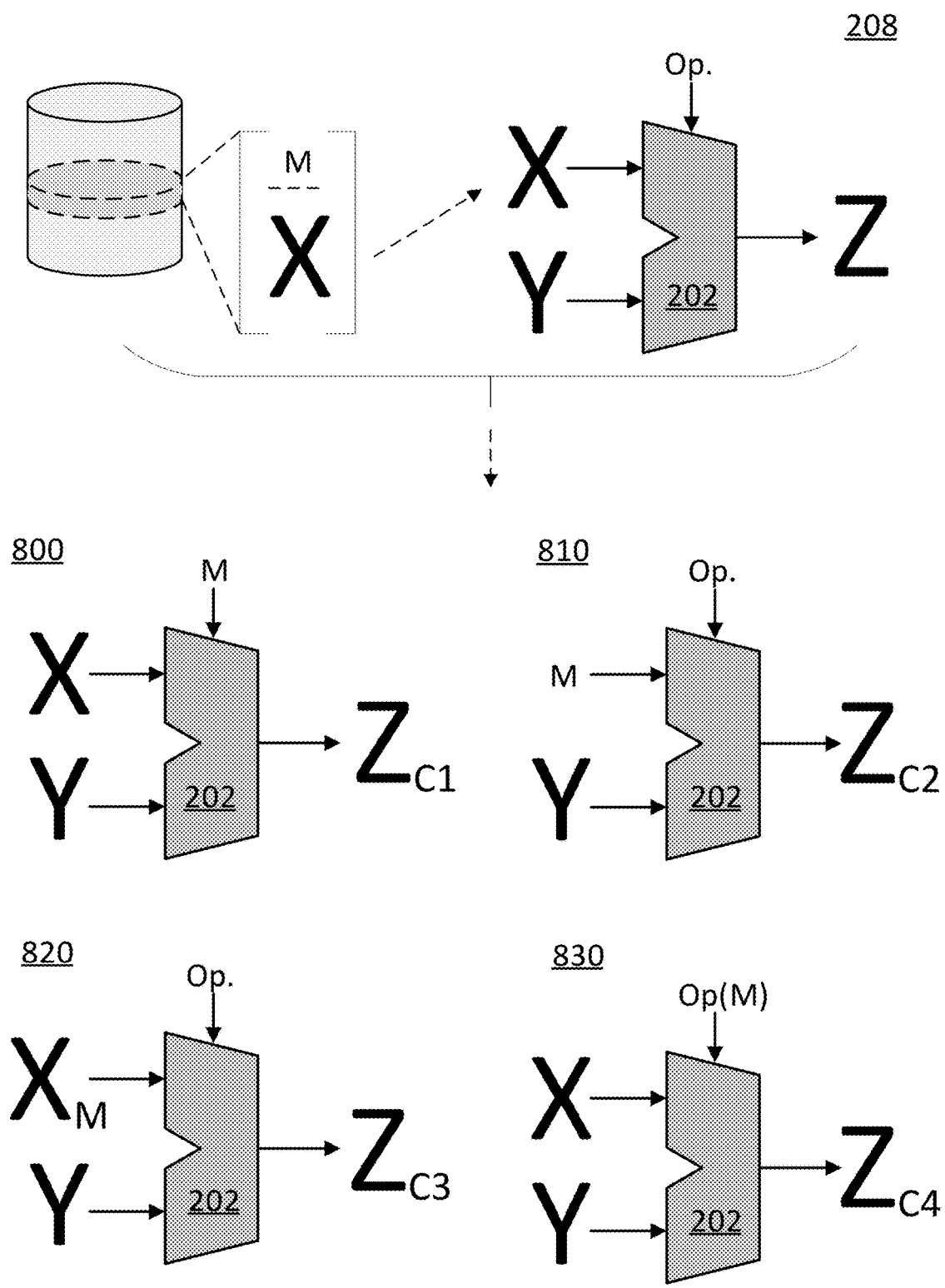
FIG. 8 provides a data flow diagram of different approaches for conditional execution using metadata in accordance with some of the embodiments disclosed herein.

FIG. 8 illustrates ways in which the metadata M of a tile can be used to actuate a conditional execution of standard execution 208. In the diagrams of FIG. 8, the conditional execution of specific operations is provided as an example, but the same concepts apply to the conditional execution of entire instructions. In diagram 800, the metadata is itself a stored version of an operation command "Op." for ALU 202. As the operation will be different than the operation command "Op." used in standard execution 208, this will result in a different output $Z_{C1}$ being produced by the conditional execution. The metadata itself is therefore applied to the ALU to condition the execution. In diagram 810, the metadata is itself substitute directed graph execution data that is used in place of data elements X to produce a different output $Z_{C2}$. In diagram 820, the metadata is used to alter data elements from X to $X_M$ before they are applied to the ALU. For example, $X_M$ could be a lower precision version of X such as in a situation in which X is a floating point variable and $X_M$ is a fixed point variable, or a situation in which X is a 16-bit variable and $X_M$ is a 4-bit variable. As another example, $X_M$ could only retain the sign of X. As another example, $X_M$ could be a fixed number pulled from another location in memory based on an address set by M. As $X_M$ is not equivalent to X this will result in an output $Z_{C3}$ that is not equal to Z. In diagram 830, the operation command has been modified by data stored in M as opposed to the metadata M being the operation command itself as in 800. As Op(M) is not equivalent to "Op.", this will result in an output $Z_{C4}$ that is not equal to Z. In the alternative, data stored in M could be used to assure that the operation was not executed. In the alternative or in combination, data stored in M could be used to substitute for Z without the operation being conducted.

The instructions and operations required for the execution of the directed graph can be conditioned in numerous ways. Generally, the degree to which a computation is conditioned can be set to vary across the directed graph and can include various gradations that align with the relative priority of that portion of the graph. For example, regions of relatively high priority could be computed just as they would be in the unconditionally executed directed graph, while regions of relatively low priority could be excluded from computation entirely. The various approaches for conditional computation discussed below could be mixed and assigned in various ways to the levels of priority. For example, high, medium, and low priorities could be associated with three entirely separate conditional computation schemes. As another example, the conditional computation scheme could be held constant across the directed graph, but the relative accuracy of the scheme could be modified in accordance with the priorities. For example, a degree of rounding or downsampling could be set proportional to the priority level with a smooth transition from using the original values, to using rounded values, to execution conducted independently of the original values. Such approaches could be efficiently applied if the priority value was a smoothly varying numerical value.

The actual conditional execution of the directed graph can be conducted in various ways. The conditioning and the forms of conditional computation being separated concepts. Based on the execution data, the fidelity of various computations in the execution of the directed graph can be selectively decreased to different levels. For example, the precision of computations could be decreased from 16-bit to 8-bit. As another example, the conditional computation could involve decreasing the number of bits used to represent the inputs or outputs of a given computation. As another example, the data structure used to represent the data elements of a given computation could be simplified (e.g., from 8-bit floating point to 4-bit fixed point). The data structure format of the data elements could be converted between all formats while being brought into data RAM on the processor core via direct memory access. As another example, the conditional computation could involve providing a fixed pre-computed value from memory in place of executing the computation. In one example, this value could be stored in a header of a data tile that would otherwise have been involved in the computation. As another example, the actual arithmetic portion of the computation could be simplified such that it discarded a certain number of LSBs from the computation. As another example, the computation could be suppressed altogether without even the need for providing a masked value. In even more specific approaches, replacement values for the output of the computation could be stored downstream in association with later stages of the directed graph. For example, upon review of the metadata in the input tiles to an instruction, it could be determined that the instruction does not need to be executed, and the precomputed metadata of the output tile could be used as the output of the instruction. Furthermore, individual computations could be subjected to conditioning and conditioned in a programmatic fashion as described above with reference to FIG. 6 and the associated pseudo code.

Figure 9:
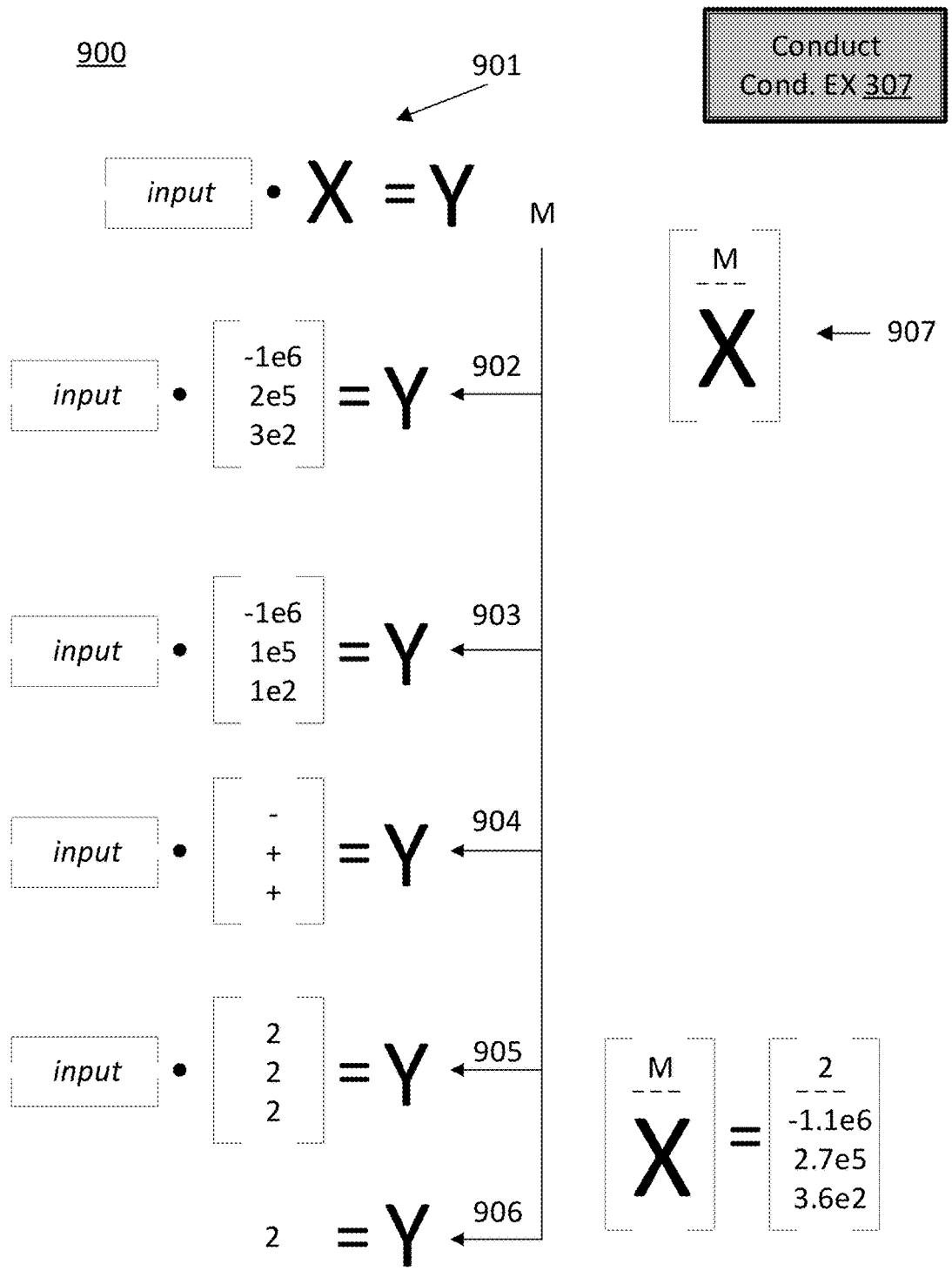
FIG. 9 includes an illustration of specific approaches for conditionally executing a directed graph in accordance with some of the embodiments disclosed herein.

FIG. 9 is an illustration of ways by which the conditional execution of the operations can be executed. In the diagrams of FIG. 9, the conditional execution of specific operations is provided as an example, but the same concepts apply to the conditional execution of entire instructions. Data flow diagram 900 includes a first computation 901 that needs to be computed to execute a directed graph. The branches moving down the page indicate various levels of conditional execution that could be used in place of the original operation based on the priority value of the associated tile or operation. For example, if computation 901 had a major impact on the output of the directed graph, it might be executed in full. However, if the impact was slight, the computation could be conditionally executed in accordance with one of the substitute levels shown by 902-906.

The level of precision applied to a given operation could be implied by the metadata of the data elements involved in the calculation. The metadata could include a direct indicator of a level of precision that should be applied, or data that is used by a program to determine the level of precision that should be applied. In the illustrated case, the metadata is M and it is associated with data element X in tile 907. Priority level 902 could involve a slight rounding of the data values and the potential reduction in the number of bits utilized by the data structures storing the values. Priority level 903 could involve keeping only the sign and exponent of the original values. Priority level 904 could involve only keeping the sign of the original values. Another priority level could approximate the data elements using lower precision such as by replacing the data elements with lower bit approximations. Priority level 905 could involve replacing the data elements with a predetermined value. Priority level 906 could involve skipping the operation altogether and providing a predetermined value in place of the output of the operation. As illustrated, the value for conditional executions such as priority levels 905 and 906 could be stored in the header of a tile, and could be pulled for substitution if the conditional execution system determined that the priority of the payload of the tile was very low. The predetermined values could be all zeros, white noise with a certain power level, or all constant values. The power level or constant values could be calculated during the execution of prior operations, or using a separate process that evaluates the tiles orthogonally to any execution of the directed graph. Specific implementations of priority levels 905 and 906 therefore represent a different class of conditional execution because the metadata is injected into the data flow of the execution as opposed to serving as an indication of a type of conditional execution that should be executed.

Prior to running computations that use data tiles, the processing core can inspect separate data associated with the payload of the tiles. The separate data can be the metadata of the tile. The processing core can then either execute the operations need to implement the computations, reduce the precision of those operations, or provide a pre-computed approximation in place of the output from the standard execution of the operation. In a specific combination of the approaches described above, prior executions tag data tiles with metadata indicating the tiles are of "high," "medium," or "low" importance. Then during a later conditional execution the computations tagged "low" are suppressed entirely, while the precision of the operations involving the "high" and "medium" importance tiles are optimized between two different levels selected from 4-bit, 8-bit, and 16-bit precision. Such an approach could potentially provide performance enhancements by a factor of 2-3 times a reduction in work required for the execution of a given ANN while receiving the same output for any inference across the input space of the ANN.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. The data structures used to implement the weights, accumulation values, filters, inputs, outputs, etc. of the systems described herein can all be four dimensional or five dimensional tensors. In particular, the data elements stored in the tiles could store at least portions of four and five dimensional tensors. The directed graph and the simplified version of the directed graph described herein could be wholly different structures implemented in memory. Although examples in the disclosure were generally directed to machine intelligence systems, the same approaches could be utilized to any computationally intensive application involving the execution of a directed graph. Although examples in the disclosure were generally directed to ANNs, the same approaches could be utilized to enhance the operation of support vector machines, neuromorphic hardware generally, and any deep learning approach involving a complex set of layers. These and other modifications and variations to the present invention may be practiced by those skilled in the art, without departing from the scope of the present invention, which is more particularly set forth in the appended claims.

What is claimed is:

1. A computer-implemented method for a conditional execution of a directed graph comprising:
   evaluating a set of output data from an execution engine;
   generating metadata for a first data tile based on the evaluating of the set of output data;
   storing, subsequent to the evaluating of the set of output data, a first data tile in a random access memory, wherein the set of output data is stored as a first set of data elements in the first data tile, wherein the first data tile includes a header, and wherein the metadata is stored in the header in the random access memory;
   storing a second data tile in the random access memory, wherein the second data tile includes a second set of data elements;
   fetching, subsequent to the storing of the first data tile and metadata in the random access memory, an instruction, for execution by the execution engine, wherein execution of the instruction requires an arithmetic logic operation using: (i) an arithmetic logic unit; (ii) a first data element in the first set of data elements; and (iii) a second data element in the second set of data elements;
   evaluating the metadata from the header; and
   conditionally executing the arithmetic logic operation based on the evaluating of the metadata;
   wherein a conditionally executed output of the arithmetic logic unit resulting from the conditional execution of the arithmetic logic operation is not equal to a standard output of the arithmetic logic unit resulting from a standard execution of the arithmetic logic operation.

2. The computer-implemented method of claim 1, further comprising:
   compressing the set of output data from the arithmetic logic unit using a compression engine, wherein the compressed set of output data is subsequently stored as the first set of data elements in the first data tile;
   evaluating a set of non-sparse data values in the set of output data during the compressing; and
   generating the metadata for the first data tile based on the evaluating of the set of non-sparse data values.

3. The computer-implemented method of claim 2, wherein:
   the non-sparse data values are zeroes;
   the metadata is a flag indicating the first set of data elements is all zeroes; and
   conditionally executing the arithmetic logic operation based on the evaluating of the metadata involves suppressing the arithmetic logic operation.

4. The computer-implemented method of claim 2, wherein:
   the non-sparse data values are zeroes;
   the metadata is a flag indicating the first set of data elements is all zeroes;
   evaluating the metadata involves identifying the flag; and
   conditionally executing the arithmetic logic operation based on the evaluating of the metadata involves suppressing the arithmetic logic operation and suppressing retrieval of the first set of data elements from memory.

5. The computer-implemented method of claim 1, wherein:
   the metadata includes at least two flags associated with at least two portions of the first data tile in a one-to-one correspondence.

6. The computer-implemented method of claim 5, wherein:
   the portions of the first data tile are each x-y planes of a three-dimensional tensor; and
   the flags indicate if their corresponding x-y plane is all zero, wherein the flags and their corresponding x-y planes correspond according to the one-to-one correspondence.

7. The computer-implemented method of claim 1, wherein:
   the metadata is a flag indicating the first set of data elements are all zeroes; and
   conditionally executing the arithmetic logic operation based on the evaluating of the metadata involves suppressing the arithmetic logic operation.

8. The computer-implemented method of claim 1, wherein:
   the instruction is part of an instruction sequence for a standard execution of the directed graph;
   the first set of data elements are directed graph data elements of the directed graph;
   the second set of data elements are directed graph data elements of the directed graph; and
   the conditional execution is less computationally intensive than the standard execution.

9. The computer-implemented method of claim 8, wherein:
   the directed graph represents an artificial neural network;
   the artificial neural network has a layer; and
   the first and second data tiles have less data than the layer.

10. The computer-implemented method of claim 1, further comprising:
    generating the metadata for the first data tile using a software controller; and storing the metadata in a tile header of the first data tile;
wherein the conditional execution uses the metadata.

11. The computer-implemented method of claim 1, further comprising:
setting a size of the first data tile using a software controller.

12. The computer-implemented method of claim 1, wherein conditionally executing the arithmetic logic operation based on the evaluating of the metadata comprises:
determining that the metadata for the first data tile includes a flag; and
causing the arithmetic logic operation to be conditionally executed in response to determining that the metadata for the first data tile includes a flag.

13. The computer-implemented method of claim 1, wherein conditionally executing the arithmetic logic operation using the metadata comprises:
entirely suppressing the arithmetic logic operation; and
providing a zero value in place of the conditionally executed output.

14. The computer-implemented method of claim 1, further comprising:
storing the metadata in a register of a control unit of the arithmetic logic unit; and
evaluating the metadata involves the control unit checking a value in the register;
wherein conditionally executing the arithmetic logic operation based on evaluating of the metadata involves the control unit suppressing transmission of the operation to the arithmetic logic unit.

15. A processing core comprising:
a random access memory;
an execution engine;
a firmware controller configured to evaluate a set of output data from the execution engine and generate metadata for a first data tile based on the evaluating of the set of output data;
a first data tile stored in the random access memory, wherein the first data tile includes: (i) a first set of data elements; and (ii) a header storing the metadata;
a second data tile stored in the random access memory, wherein the second data tile includes a second set of data elements;
an arithmetic logic unit configured to conduct an arithmetic logic operation using data from the first set of data elements and the second set of data elements; and
a control unit configured to: (i) fetch an instruction for execution by the execution engine wherein execution of the instruction requires the arithmetic logic unit to conduct the arithmetic logic operation; (ii) evaluate the metadata from the header while executing the instruction; and (iii) control the arithmetic logic unit to conditionally execute the arithmetic logic operation based on the evaluation of the metadata.

16. The processing core of claim 15, further comprising:
a compression engine configured to read a set of output data from a set of math accumulation buffers, and evaluate a set of non-sparse data values in the set of output data, wherein the set of math accumulation buffers are coupled to the arithmetic logic unit;
wherein the firmware controller is configured to generate the metadata for the first data tile based on the evaluation of the set of non-sparse data values in the set of output data conducted by the compression engine, and store the metadata in the header of the first data tile.

17. The processing core of claim 16, wherein:
the non-sparse data values are zeroes;
the metadata is a flag indicating the first set of data elements is all zeroes; and
the control unit is configured to suppress the arithmetic logic operation when conditionally executing the arithmetic logic operation.

18. The processing core of claim 15, wherein:
the arithmetic logic operation is required for a standard execution of a directed graph;
a conditionally executed output of the arithmetic logic unit resulting from conditional execution of the arithmetic logic operation is not equal to a standard output of the arithmetic logic unit resulting from a standard execution of the arithmetic logic operation;
the first set of data elements are directed graph data elements of the directed graph;
the second set of data elements are directed graph data elements of the directed graph; and
the conditional execution is less computationally intensive than the standard execution.

19. The processing core of claim 18, wherein:
the directed graph represents an artificial neural network;
the artificial neural network has a layer; and
the first and second data tiles have less data than the layer.

20. The processing core of claim 18, further comprising:
a register in the control unit that is provided with the metadata during the execution of the instruction;
wherein the control unit is configured to evaluate the metadata by checking a value in the register; and
wherein conditionally executing the arithmetic logic operation based on evaluating the metadata involves the control unit suppressing transmission of the operation to the arithmetic logic unit.

* * * * *

UNITED STATES PATENT AND TRADEMARK OFFICE
CERTIFICATE OF CORRECTION

PATENT NO. : 11,113,051 B2
APPLICATION NO. : 16/153991
DATED : September 7, 2021
INVENTOR(S) : Ljubisa Bajic et al.

It is certified that error appears in the above-identified patent and that said Letters Patent is hereby corrected as shown below:

In the Specification

Column 4, Line 58, please delete "direct" and insert --directed--.
Column 5, Line 4, please delete "processor" and insert --processing--.
Column 5, Line 26, please delete "direct" and insert --directed--.
Column 7, Line 64, please insert --204-- after "data tile".
Column 8, Line 63, please delete "that" and insert --than--.
Column 9, Line 19, please delete the first appearance of "FIG. 3" and insert --FIG. 2--.
Column 9, Line 35, please delete "way" and insert --ways--.
Column 9, Line 44, please delete "direct" and insert --directed--.
Column 10, Line 17, please delete "direct" and insert--directed--.
Column 10, Line 54, please delete "processor" and insert --processing--.
Column 11, Line 15, please delete "be" and insert --by--.
Column 11, Line 26, please delete "where" and insert --were--.
Column 11, Line 33, please delete "could be used".
Column 11, Line 53, please delete "adapts" and insert --adapt--.
Column 12, Line 21, please insert --400-- after "illustration".
Column 15, Line 31, please delete "beings" and insert --begins--.
Column 15, Line 43, after "Step 706", please delete "step".
Column 17, Line 48, please delete "processor" and insert --processing--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*